(12) United States Patent
Gubbins et al.

(10) Patent No.: US 8,228,632 B2
(45) Date of Patent: Jul. 24, 2012

(54) TRANSDUCING HEAD DESIGN FOR MICROWAVE ASSISTED MAGNETIC RECORDING

(75) Inventors: Mark Anthony Gubbins, Letterkenny (IE); Alex Wong, Londonderry (GB); Robert William Lamberton, Limavady (GB)

(73) Assignee: Seagate Technology LLC, Scotts Valley, CA (US)

( * ) Notice: Subject to any disclaimer, the term of this patent is extended or adjusted under 35 U.S.C. 154(b) by 500 days.

(21) Appl. No.: 12/469,377

(22) Filed: May 20, 2009

(65) Prior Publication Data

US 2010/0296194 A1 Nov. 25, 2010

(51) Int. Cl.
G11B 5/127 (2006.01)
(52) U.S. Cl. .......... 360/123.03; 360/125.31; 360/125.74
(58) Field of Classification Search .................. None
See application file for complete search history.

(56) References Cited

U.S. PATENT DOCUMENTS

| | | | |
|---|---|---|---|
| 4,530,016 A | 7/1985 | Sawazaki | |
| 6,011,664 A | 1/2000 | Kryder et al. | |
| 6,665,136 B2 * | 12/2003 | Clinton et al. | 360/55 |
| 7,212,367 B2 | 5/2007 | Clinton et al. | |
| 7,256,955 B2 | 8/2007 | Pokhil et al. | |
| 7,855,853 B2 * | 12/2010 | Linville et al. | 360/125.3 |
| 2003/0039068 A1 | 2/2003 | Crawford et al. | |
| 2005/0023938 A1 | 2/2005 | Sato et al. | |
| 2006/0198047 A1 * | 9/2006 | Xue et al. | 360/126 |
| 2007/0183190 A1 | 8/2007 | Eyckmans et al. | |
| 2007/0253106 A1 * | 11/2007 | Sato et al. | 360/126 |
| 2008/0042779 A1 | 2/2008 | Carey et al. | |
| 2008/0112087 A1 | 5/2008 | Clinton et al. | |
| 2008/0117545 A1 * | 5/2008 | Batra et al. | 360/125.01 |
| 2008/0137224 A1 | 6/2008 | Gao et al. | |
| 2008/0259493 A1 * | 10/2008 | Kief et al. | 360/119.01 |
| 2009/0262457 A1 * | 10/2009 | Rivkin et al. | 360/110 |
| 2010/0073804 A1 * | 3/2010 | Ikeda et al. | 360/59 |
| 2010/0195247 A1 | 8/2010 | Mochizuki et al. | |
| 2010/0208379 A1 | 8/2010 | Ikeda et al. | |
| 2010/0296194 A1 | 11/2010 | Gubbins et al. | |
| 2010/0309577 A1 | 12/2010 | Gao et al. | |
| 2011/0043943 A1 | 2/2011 | Igarashi et al. | |

OTHER PUBLICATIONS

W. Scholz et al., "Micromagnetic modeling of ferromagnetic resonance assisted switching," from Journal of Applied Physics 103. 07F539 (2008) 3 pages.
J. Zhu et al., "Microwave Assisted Magnetic Recording," from IEEE Transactions on Magnetics, vol. 44, No. 1, (Jan. 2008) pp. 125-131.
K. Yamakawa et al., "Single-pole recording head design for 100 Gbpsi perpendicular magnetic recording," from Journal of Magnetism and Magnetic Materials 235 (2001) pp. 354-361.
M. Mallary, "Recording Head Design," from the Physics of Ultra-High-Density Magnetic Recording, (M. L. Plumer et al., eds.) (2001) pp. 314-347, plus title pages.

* cited by examiner

*Primary Examiner* — Kevin Bernatz
(74) *Attorney, Agent, or Firm* — Hall Estill Attorneys at Law

(57) ABSTRACT

A non-limiting embodiment of a magnetic writer has at least a write element having a write element tip and a conductive structure adjacent the write element. The conductive structure has at least two conductive elements positioned substantially parallel to one another and separated by an electrically insulating material. Each of the conductive elements carries a time-varying signal to generate an oscillating magnetic field from a displacement current between the two conductive elements, with the oscillating magnetic field being proximate the write element tip and extending parallel to the air bearing surface. A frequency of the oscillating magnetic field is a function of a frequency of the time-varying signal.

16 Claims, 4 Drawing Sheets

US 8,228,632 B2

TRANSDUCING HEAD DESIGN FOR MICROWAVE ASSISTED MAGNETIC RECORDING

SUMMARY

A magnetic writer according to various embodiments have a write element with a write element tip and a conductive structure adjacent the write element. The conductive structure includes two conductive elements positioned substantially parallel to one another and separated by an electrically insulating material. Each of the conductive elements carries a time-varying signal to generate an oscillating magnetic field from a displacement current between the two conductive elements, with the oscillating magnetic field being proximate the write element tip and extending parallel to the air bearing surface. A frequency of the oscillating magnetic field is a function of a frequency of the time-varying signal.

DETAILED DESCRIPTION

In general, various embodiments have one or more ferromagnetic resonance (FMR) assist features for microwave assisted magnetic recording (MAMR) systems. More particularly, a transducing head with a writer having two conductive elements positioned substantially parallel to one another. The two conductive elements are arranged substantially perpendicular to an air bearing surface (ABS) of the transducing head and to a plane of a magnetic recording medium. Each of the conductive elements carries a time-varying current at a frequency greater than approximately 2 GHz to generate an oscillating magnetic field from a displacement current between the two conductive elements, with a frequency of the oscillating magnetic field being a function of a frequency of the time-varying current. The oscillating magnetic field has a vector component that extends in-plane with the magnetic recording medium. The two conductive elements can be located proximate a write element tip of the writer.

While not exclusive, MAMR systems may provide enhanced operation as the write pole is reduced in dimension to record data tracks on the magnetic storage medium at higher densities, such as those exceeding about 500 Gbit/in$^2$ presence of the microwave frequency magnetic assist field allows the write pole to record data at reduced write pole dimensions. As magnetic anisotropy of a recording layer of the magnetic storage medium is increased thermal stability improvements in data linear densities recorded to the magnetic storage medium allow for increases in the switching field of the magnetic storage medium and in the ability of a given write pole to switch the media magnetization decreases. The presence of a microwave frequency magnetic assist field the switching field of this high anisotropy magnetic storage medium and allow the writer to record data. As such, the use of microwave frequency magnetic assist fields yields improvements in the capability of the writer to write at higher track densities and higher linear densities.

Figure 1:
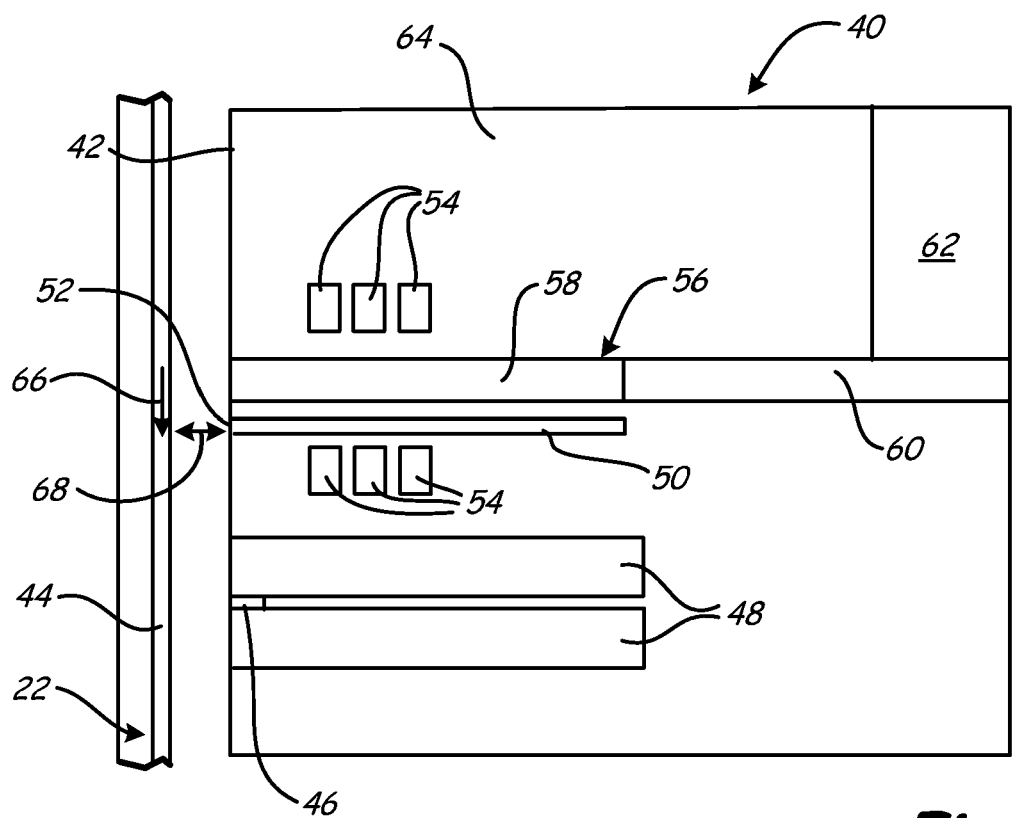
FIG. 1 is a schematic cross-sectional view of a transducing head and magnetic storage medium, taken perpendicular to an air bearing surface of the transducing head.

FIG. 1 is a schematic cross-sectional view of a disc (or other magnetic storage medium) 22 and a transducing head 40, taken perpendicular to an ABS 42 of the transducing head 40. For simplicity, no cross-hatching is shown in FIG. 1. The transducing head 40 can be carried by the slider. The disc 22 has at least a layer of recording material 44 that faces the transducing head 40, in which data tracks are defined. In modern hard disc drives (HDDs), the layer of recording material 44 can comprise an alloy of CoPt, Co—Cr—Pt—SiO$_2$, etc. In one embodiment, the disc 22 and the transducing head 40 are configured for perpendicular recording, but in alternative embodiments can be longitudinal or tilted in configuration.

While not limiting, the transducing head 40 includes a reader assembly and a writer assembly. The reader assembly has a read element 46 positioned between a pair of shields 48. It should be noted that the reader assembly is optional, and is not required. The writer assembly includes a write pole 50 having a write pole tip 52, a coil 54, and a MAMR subassembly 56. The write pole 50 can be arranged substantially perpendicular to the ABS 42 of the transducing head 40, and can comprise a high moment magnetic material.

The MAMR subassembly 56 has a pair of write assist elements (collectively designated by reference number 58), and corresponding pairs of interconnect traces 60 and electrical connection pads 62. The write assist elements 58 extend substantially parallel to one another in a generally coplanar configuration, and are arranged substantially perpendicular to the ABS 42 of the transducing head 40. In the illustrated embodiment, the pair of write assist elements 58 are arranged substantially parallel to the write pole 50. The write assist elements 58 each comprise an electrically conductive material, such as Cu, Au, or other suitable materials. Each of the write assist elements 58 is electrically connected to one of the interconnect traces 60 at a location distal from the ABS 42, with each of the interconnect traces 60 connected to a corresponding electrical connection pad 62 that provides an external terminal for connecting the MAMR subassembly 56 to external circuitry. It should be noted that only one of each of the element pairs in the MAMR subassembly 56 are visible in FIG. 1.

The transducing head 40 further is configured with an electrically insulating material 64 that surrounds internal components of the head 40. For instance, the electrically insulating material 64 extends between the pair of write assist elements 58. It should be noted that in further embodiments the transducing head 40 can be constructed with additional features not shown in FIG. 1, and the configuration of the transducing head 40 can vary in alternative embodiments. In one such embodiment, additional electrical connection pads (not shown) for the writer, reader, heater elements, etc. can be provided. Moreover, the configuration and location of the coil 54 can vary as desired for particular applications.

Figure 2:
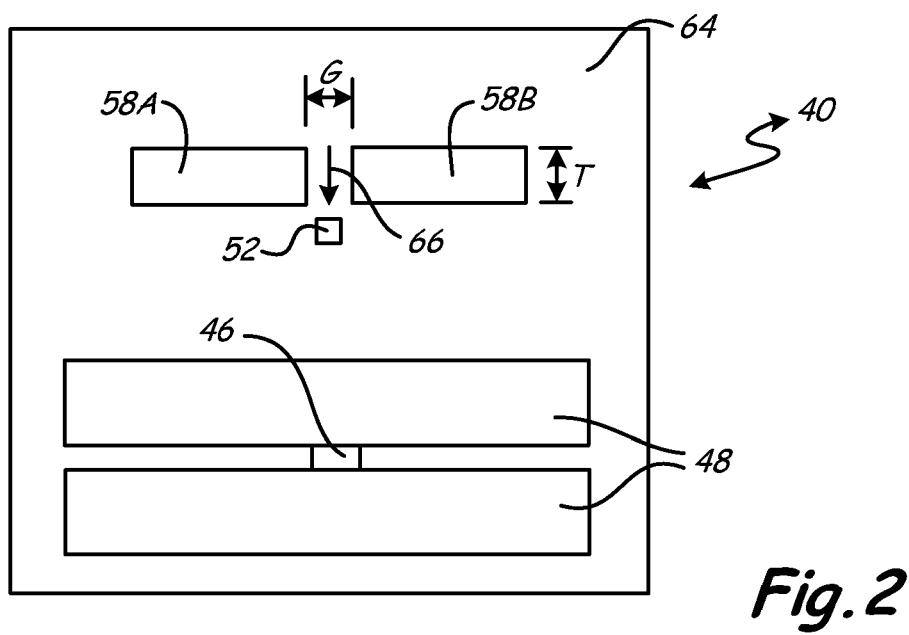
FIG. 2 is an air bearing surface view of the transducing head.

FIG. 2 is an ABS view of the example transducing head 40. In the illustrated embodiment, the pair of write assist elements 58 is identified as first and second write assist elements 58A and 58B, respectively. The first and second write assist elements 58A and 58B can have substantially identical sizes and shapes. In the illustrated embodiment, the first and second write assist elements 58A and 58B each extend to the ABS 42 and are each shaped like rectangular boxes, though it should be understood that other shapes are possible on alternative embodiments. As shown in FIG. 2, the first and second write assist elements 58A and 58B are spaced from one another by a gap G, with the electrically insulating material 64 filling the gap G. The gap G can be about 10-5,000 nm, or between about 500-1,000 nm. In one embodiment, the gap G is about 500 nm. The first and second write assist elements 58A and 58B are spaced from a trailing edge of the write pole 50 in an on-track direction, with the write pole tip 52 located in between the reader and the first and second write assist elements 58A and 58B. The write pole tip 52 can be substantially aligned with a midpoint of the gap G. The first and second write assist elements 58A and 58B each have a thickness T in the on-track direction. The thickness T can be about 5,000 nm or less, or about 700 nm to about 5,000 nm. In one embodiment, the thickness T is about 5 microns. Widths of the first and second write assist elements 58A and 58B in the cross-track direction can vary as desired for particular applications, and are not as significant as the thickness T for operation. In the illustrated embodiment, lengths of the first and second write assist elements 58A and 58B (measured perpendicular to the ABS 42) are commensurate with that of the write pole 50.

A stronger magnetic assist field generally provides enhanced operation as the strength of the magnetic assist field varies as a function of the gap G and the thickness T. It is be possible to tune the magnetic assist field with greater values of the thickness T and smaller values for the gap G to produce predetermined stronger magnetic assist fields.

The transducing head 40 can be manufactured using one or more non-limiting fabrication techniques, such as photolithography, trench patterning, etc.

Figure 3:
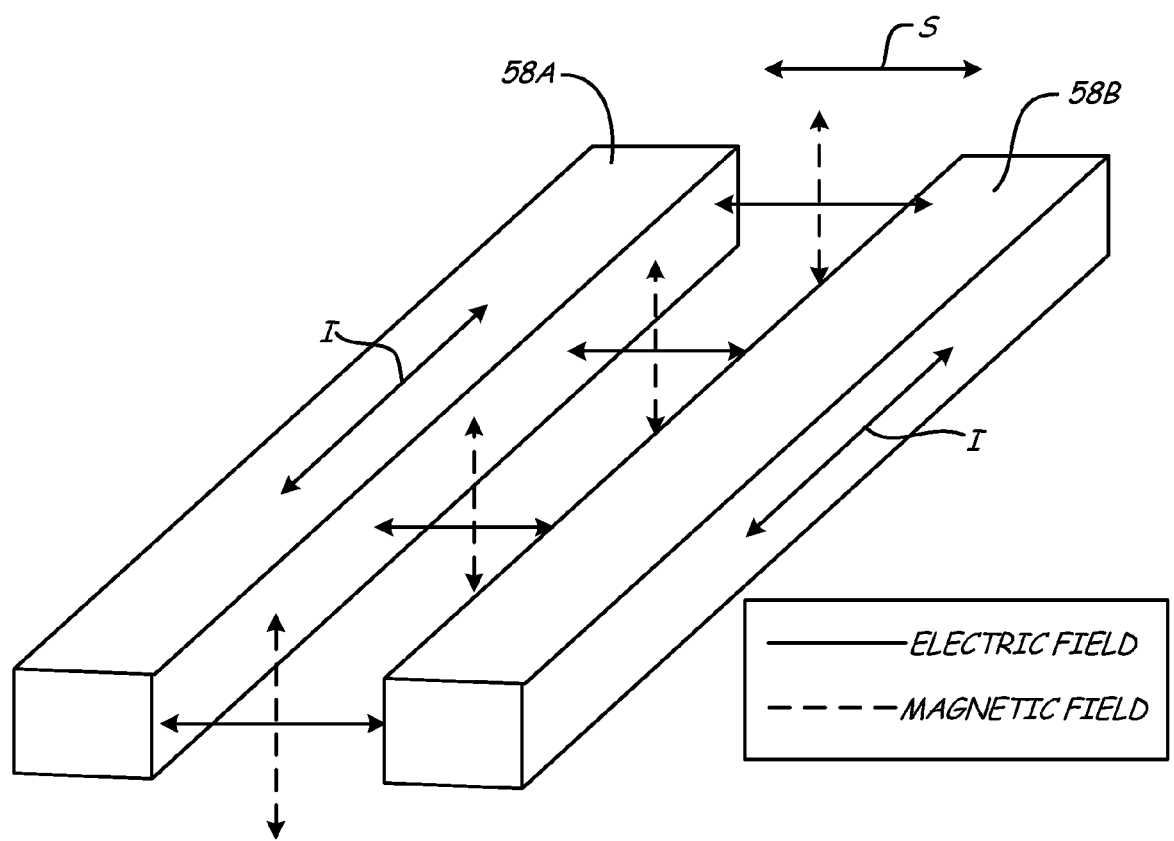
FIG. 3 is a perspective view of write assist elements of the transducing head.

FIG. 3 is a perspective view of the first and second write assist elements 58A and 58B of the exemplary transducing head 40, shown in isolation (i.e., other portions of the transducing head 40 are not shown). As shown in FIG. 3, a time-varying oscillating electrical signal S is applied to the first and second write assist elements 58A and 58B such that a current I is applied along the length of each of the first and second write assist elements 58A and 58B. The oscillating electrical currents I generate a time-varying electric field between the first and second write assist elements 58A and 58B, illustrated in FIG. 3 by solid arrows. As the time-varying electric field passes along the first and second write assist elements 58A and 58B, a displacement current passes between the first and second write assist elements 58A and 58B, which generates a time-varying oscillating magnetic assist field, illustrated in FIG. 3 by dashed arrows. The time-varying oscillating magnetic field passes between the first and second write assist elements 58A and 58B in a direction perpendicular to the time-varying electric field and in a direction parallel to the first and second write assist elements 58A and 58B. As shown in FIGS. 1 and 2, but not required, the oscillating magnetic field has a vector component 66 oriented substantially parallel to the ABS 42, perpendicular to the first and second write assist elements 58A and 58B, and in-plane with the layer of recording material 44 of the disc 22. An overall oscillating magnetic assist field produced by the MAMR subsystem 56 is dominated by the vector component 66 of the magnetic assist field (or FRM field) in the on-track direction, and cross-track and perpendicular components were negligible in comparison (see FIG. 4). In particular, a peak magnitude of the magnetic assist field occurs at the midpoint of the gap G between the first and second write assist elements 58A and 58B (see FIG. 4).

The oscillating magnetic assist field can be placed over a magnetic field 68 produced by the write pole 50, and can extend to an adjacent portion of the disc 22 to assist with recording proximate the trailing edge of the write pole 50 (see FIG. 1). The oscillating magnetic assist field is introduced into the layer of recording material 44 reducing a media switching field and improving the ability of the writer to record data to the disc 22.

The oscillating magnetic assist field vector component 66 is shown perpendicular to magnetic moments of bits defined in the layer of recording material 44 of the disc 22, and exerts a torque on those magnetic moments. Such torque causes the magnetic moments of the bits to tilt and rotate off axis. At certain frequencies, the torque exerted on the layer of recording materials 44 causes the magnetization moments to resonate with the applied signal. A frequency of FMR for the layer of recording material 44 occurs in a range of about 2-100 GHz for materials typically used in modern HDDs, and more particularly within a range of about 10-50 GHz for various materials of the layer of recording material 44. It should be noted that previous generation HDDs utilized different compositions of recording materials, which generally experience FMR effects in different frequency ranges than the materials used in modern HDDs.

In a recording system, the magnetic assist field is introduced into the layer of recording material 44 as the write pole 50 attempts to switch the magnetization of a given bit in order to record information to the disc 22. Switching of bits on the disc 22 occurs when a magnetic field from the write pole 50 is applied. However, the FMR effect produced by the magnetic assist field lowers the magnetic switching field of the layer of recording material 44, which facilitates easier switching of media magnetization and allows easier writing of data bits to the disc 22. The ability of the write pole 50 to record information to the disc 22 is therefore improved without increasing widths of the data tracks 36, and effective writing is possible even with relatively small track widths and a relatively small transducing head 40.

Figure 4:
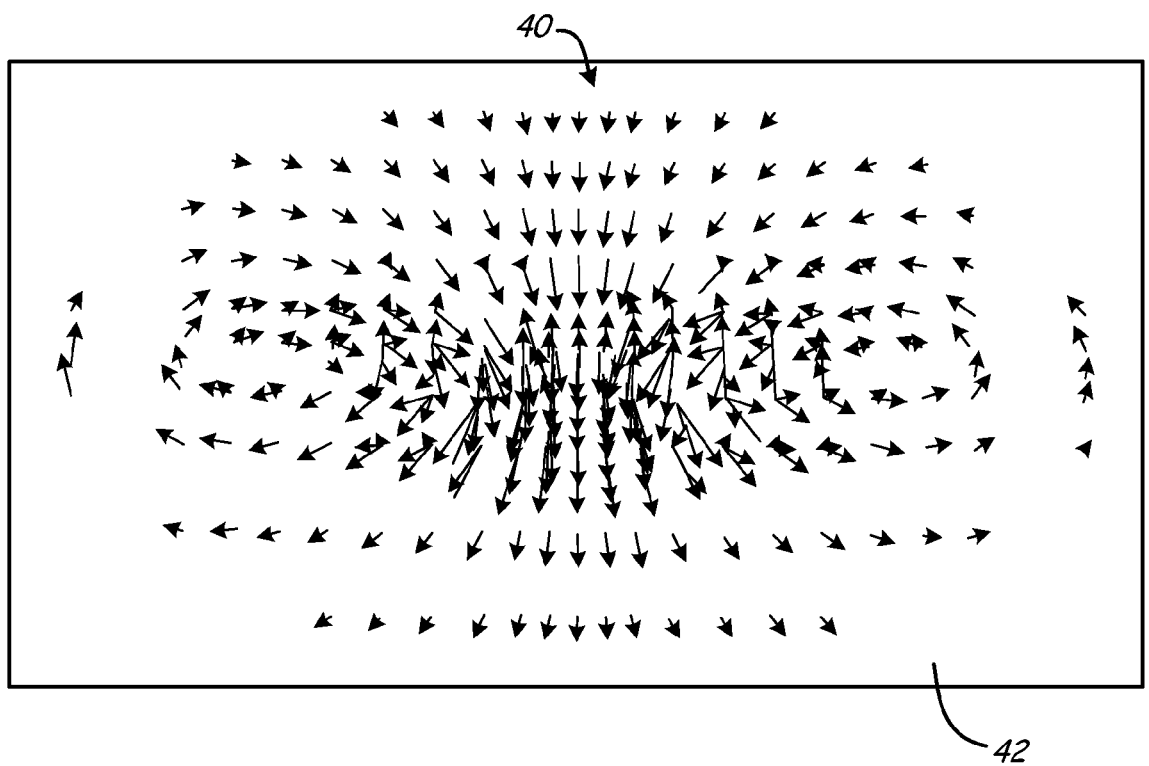
FIG. 4 is a schematic view of a magnetic write assist field generated by the transducing head, shown looking at the air bearing surface.

FIG. 4 is a schematic view of the magnetic write assist field generated by the exemplary transducing head 40, shown looking at the ABS 42. As shown in FIG. 4, arrows represent magnetization vector components of the magnetic write assist field. Although not specifically shown in FIG. 4, the first and second write assist elements 58A and 58B are located at left and right sides of the figure, with the gap G located in approximately the center of the figure. The relatively large concentration of magnetization vectors in the center of FIG. 4 correspond to a peak magnitude of the oscillating magnetic assist field that occurs at the midpoint of the gap G between the first and second write assist elements 58A and 58B.

Figure 5:
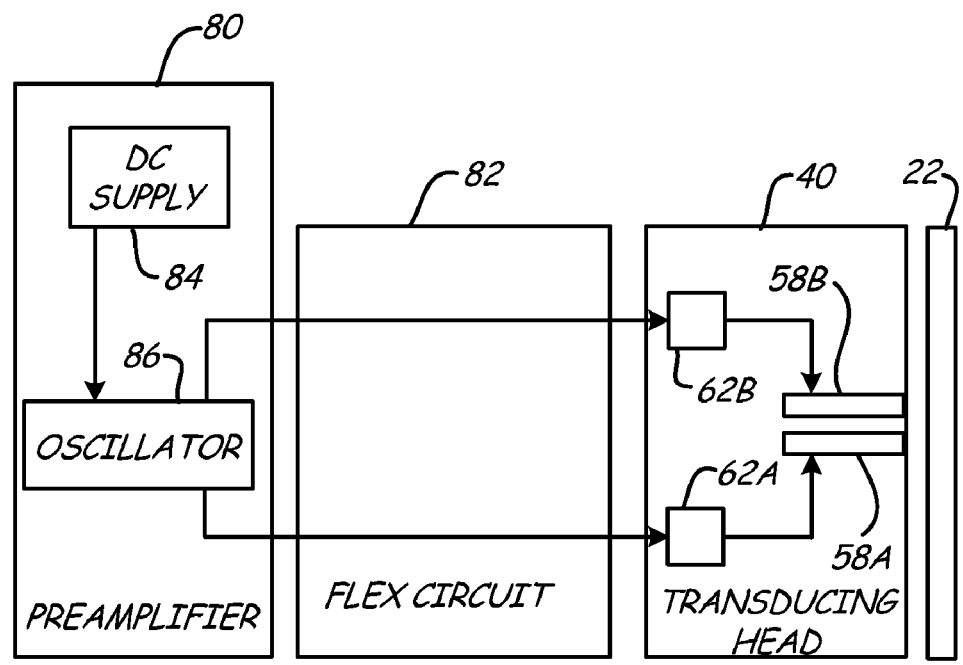
FIG. 5 is a schematic view of an embodiment of an electrical circuit associated with the transducing head.

FIG. 5 is a schematic view of an electrical circuit associated with the exemplary transducing head 40 that includes a preamplifier 80 and a flex circuit 82. The disc 22 is shown in FIG. 5 for reference. Also, the pads 62 are separately identified as first and second pads 62A and 62B, respectively, in FIG. 5. In the illustrated embodiment, the preamplifier 80 has at least a DC power supply 84 electrically connected to an oscillator circuit 86. The preamplifier 80 can generally be any number of non-limiting designs, and the oscillator circuit 86 can be configured to produce a desired oscillation frequency, as discussed further below. As shown, the preamplifier 80 is electrically connected to the flex circuit 82, which in turn is electrically connected to the first and second pads 62A and 62B, respectively. The flex circuit 82 can be of a predetermined configuration, and can be any structure capable of transmitting electrical signals along a suspension between the transducing head 40 and the remotely located preamplifier 80.

The oscillator circuit 86 creates time-varying signals for each of the first and second write assist elements 58A and 58B that pass through the flex circuit 82 to the first and second pads 62A and 62B, and from the first and second pads 62A and 62B to the first and second write assist elements 58A and 58B, respectively. In this way, time-varying signals are generated outside of the transducing head 40 and are transmitted to the first and second write assist elements 58A and 58B in the transducing head 40 in order to generate a microwave frequency magnetic write assist field as described above.

The time-varying signals generated by the oscillator circuit 86 can have a given amperage (e.g., less than or equal to about 50 milliamps) and a time-varying voltage (e.g., about 2-10 V DC). Alternatively, the time-varying signals generated by the oscillator circuit 86 can have a given voltage and a time-varying amperage. The particularly frequency of the time-varying signal can be selected as a function of material properties of the layer of recording material 44 in the disc 22, which is to say that that the frequency of the time-varying signal can be selected so as to produce an FMR effect in the layer of recording material 44 in the disc 22 as a result of the oscillating magnetic assist field generated from the time-varying signal. Greater voltages will generally produce greater magnetic assist fields. It should be noted that there may be a maximum desirable current density for particular applications, in order to reduce a risk of damage to the transducing head 40 during operation.

It should be understood that the particular frequency of signal oscillation, the signal amplitude, and other parameters can vary for particular applications. Optimal values can vary as a function of the structural, electrical and magnetic characteristics of a given transducing head 40. The frequency of the oscillating signal is generally greater than about 2 GHz, which is a range of frequencies greater than those associated with prior art wire system magnetic recording.

Figure 6:
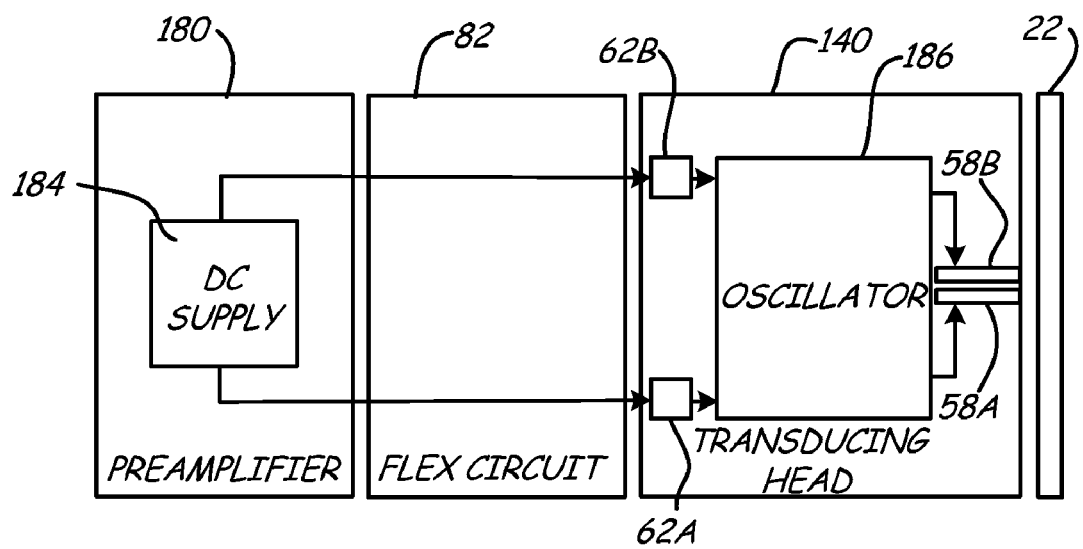
FIG. 6 is a schematic view of an embodiment of an electrical circuit associated with the transducing head.

FIG. 6 is a schematic view of an alternative embodiment of an exemplary electrical circuit associated with a transducing head 140 including a preamplifier 180 and a flex circuit 82. The configuration and operation of the electrical circuit illustrated in FIG. 6 is generally similar to that described above with respect to FIG. 5. However, in the electrical circuit of FIG. 6 an oscillator circuit 186 is located within the transducing head 140 rather than within the preamplifier 180. In this way, non-oscillating DC currents are directed from the preamplifier 180 through the flex circuit 82 to the transducing head 140. Time-varying signals are generated inside the transducing head 140 and are transmitted to the first and second write assist elements 58A and 58B in the transducing head 40 in order to generate a magnetic assist field as described above.

Those of ordinary skill in the art will recognize that the present invention provides enhanced operation. For example, various embodiments provide an alternative MAMR system that can produce suitable magnetic assist fields with on-track field strengths focused in desired locations on an adjacent magnetic storage medium.

Although the present disclosure has been described with reference to various embodiments, workers skilled in the art will recognize that changes may be made in form and detail without departing from the spirit and scope of the invention. For example, the particular configuration of reader and writer elements in a transducing head can vary as desired for particular applications.

The invention claimed is:

1. A magnetic writer comprising:
a write element positioned on an air bearing surface; and
a conductive structure adjacent to and separated from the write element, the conductive structure having two conductive elements positioned substantially parallel to one another to form a predetermined gap downtrack from the write element, each conductive structure carries a time-varying signal to generate an oscillating microwave frequency magnetic field concentrated in the predetermined gap between the two conductive elements to exert a torque on and reduce a magnetic switching field of at least one data bit stored on a corresponding magnetic storage medium prior to the write element writing data to the at least one data bit.

2. The magnetic writer of claim 1, wherein oscillating magnetic field is proximate the write element and extends parallel to the air bearing surface.

3. The magnetic writer of claim 1, wherein each of the two conductive elements are wires having a thickness in an on-track direction of less than or equal to about 5 microns.

4. The magnetic writer of claim 1, wherein the conductive structure is located adjacent a trailing edge of the write element.

5. The magnetic writer of claim 1, the time-varying signal has a first frequency greater than 2 GHz, a second frequency of the oscillating microwave frequency magnetic field measured as a function of the first frequency of the time-varying signal.

6. The magnetic writer of claim 1, wherein the conductive structure carries the time-varying signal at a frequency between about 10-50 GHz.

7. The magnetic writer of claim 1, wherein the time-varying signal carried by the conductive structure varies in voltage.

8. The magnetic writer of claim 1, wherein the time-varying signal carried by the conductive structure is less than or equal to about 50 milliamps.

9. A magnetic storage assembly comprising:
a magnetic storage medium defining a recording layer in a plane; and
a transducing head positioned adjacent to the magnetic storage medium, the transducing head comprising:
a write element positioned on an air bearing surface separating the recoding layer and the write element; and
a conductive structure adjacent to and separated from the write element, the conductive structure having two conductive elements positioned substantially parallel to one another to form a predetermined gap downtrack from the write element, each conductive structure carries a time-varying current to generate an oscillating microwave frequency magnetic field concentrated in the predetermined gap and at a magnetic resonance frequency of the recording layer of the magnetic storage medium, the oscillating microwave frequency magnetic field generated between the two conductive elements to exert a torque on and reduce a magnetic switching field of at least one data bit stored on a corresponding magnetic storage medium prior to the write element writing data to the at least one data bit.

10. The assembly of claim 9, wherein the oscillating magnetic field extends in-plane with the recording layer of the magnetic storage medium.

11. The assembly of claim 9, wherein the two conductive elements are arranged substantially perpendicular to an air bearing surface of the transducing head.

12. The assembly of claim 9, wherein each of the two conductive elements are wires having a thickness in an on-track direction of less than or equal to about 5 microns.

13. The assembly of claim 9, wherein the conductive structure is located adjacent a trailing edge of the write element.

14. The assembly of claim 9, wherein the conductive structure carries the time-varying current at a voltage that varies at a frequency between about 10-50 GHz.

15. The assembly of claim 9, wherein the time-varying current carried by the conductive structure is less than or equal to about 50 milliamps.

16. An apparatus comprising:
a write element positioned on an air bearing surface and aligned downtrack from a predetermined gap defined by first and second conductive elements, the conductive elements positioned substantially parallel to one another to form a predetermined gap distal the write element, each conductive element carries a time-varying signal to generate an oscillating microwave frequency magnetic field concentrated in the predetermined gap, the predetermined gap tuned with a predetermined width and thickness to allow the oscillating microwave frequency magnetic field to correspond to a magnetic moment of an adjacent magnetic storage medium and exert a torque that reduces a magnetic switching field of at least one data bit stored on the magnetic storage medium prior to the write element writing data to the at least one data bit.

* * * * *